US008641951B2

(12) United States Patent  
Bellin et al.

(10) Patent No.: US 8,641,951 B2
(45) Date of Patent: Feb. 4, 2014

(54) METHOD FOR THE ONE-STEP PROGRAMMING OF THE THREE-SHAPE PLASTICS

(75) Inventors: Ingo Bellin, Mannheim (DE); Andreas Lendlein, Berlin (DE)

(73) Assignee: GKSS-Forschungszentrum Geesthact GmbH, Geesthact (DE)

( * ) Notice: Subject to any disclaimer, the term of this patent is extended or adjusted under 35 U.S.C. 154(b) by 657 days.

(21) Appl. No.: 12/527,366

(22) PCT Filed: Jan. 24, 2008

(86) PCT No.: PCT/EP2008/050803
§ 371 (c)(1),
(2), (4) Date: Nov. 2, 2009

(87) PCT Pub. No.: WO2008/101760
PCT Pub. Date: Aug. 28, 2008

(65) Prior Publication Data
US 2010/0044920 A1  Feb. 25, 2010

(30) Foreign Application Priority Data

Feb. 22, 2007 (DE) .......................... 10 2007 010 564

(51) Int. Cl.
B29C 61/00 (2006.01)

(52) U.S. Cl.
USPC ............................ 264/230; 264/237; 264/339

(58) Field of Classification Search
USPC ......................................... 264/230, 237, 339
See application file for complete search history.

(56) References Cited

U.S. PATENT DOCUMENTS

| 5,442,037 A | 8/1995 | Lee et al. |
| 5,446,109 A | 8/1995 | Matsumura et al. |
| 5,506,300 A | 4/1996 | Ward et al. |
| 5,756,651 A | 5/1998 | Chen et al. |
| 6,388,043 B1 | 5/2002 | Langer et al. |

FOREIGN PATENT DOCUMENTS

| DE | 102006017759 A1 | 10/2007 |
| EP | 1338613 A | 8/2003 |
| EP | 1362879 A | 11/2003 |
| EP | 1790694 A | 5/2007 |
| WO | 95/35071 A | 12/1995 |
| WO | 99/42147 A1 | 8/1999 |
| WO | 99/42528 A2 | 8/1999 |
| WO | 01/91822 A | 12/2001 |

(Continued)

OTHER PUBLICATIONS

English Language Abstract for EP 1338613.

(Continued)

*Primary Examiner* — James Sanders
(74) *Attorney, Agent, or Firm* — Norris McLaughlin & Marcus, P.A.

(57) ABSTRACT

The invention relates to a method for producing a programmed shape memory polymer, which assumes a first temporary shape and at least two additional stored thermally activatable shapes, namely at least one second temporary shape and a permanent shape, with the steps of:

Figure 1:
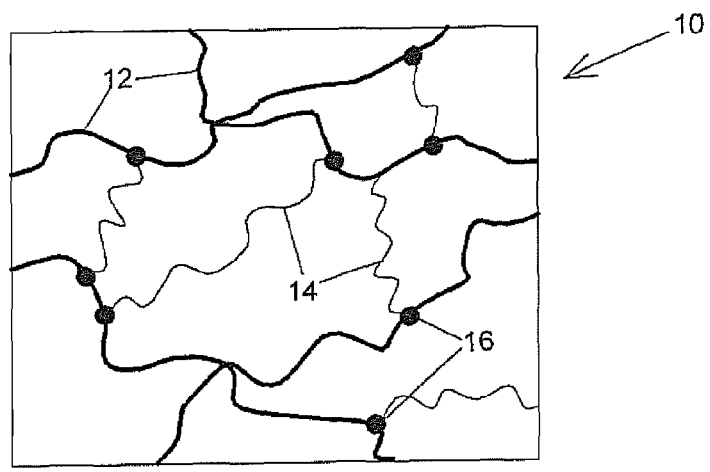

(a) providing a shape memory polymer which has at least two switching segments (A, B), which through phase segregation each form a switching phase having each a corresponding transition temperature ($T_{transA}$, $T_{transB}$), (b) deforming the shape memory polymer into a shape corresponding to the first temporary shape at a temperature above the upper transition temperature ($T_{transA}$), and (c) cooling to a temperature below the lower transition temperature ($T_{transB}$) by fixing the first temporary shape.

The method of the invention provides a one-step programming method for a triple-shape plastic material.

16 Claims, 2 Drawing Sheets

(56) References Cited

FOREIGN PATENT DOCUMENTS

| WO | 2004/033539 A | 4/2004 |
| WO | 2004/090042 A | 10/2004 |
| WO | 2007/118766 A | 10/2007 |

OTHER PUBLICATIONS

English Language Abstract for EP 1362879.
English Language Abstract for WO2004090042.
English Language Abstract for WO2007118766.
Bellin et al. (Proc. Natl. Acad. Sci. U.S.A. 2006, 103, 18043-18047).
Liu et al. (Macromol Rap. Comm. 26, 2005, 649 ff).

METHOD FOR THE ONE-STEP PROGRAMMING OF THE THREE-SHAPE PLASTICS

This application is a 371 application of PCT/EP2008/050803 filed Jan. 24, 2008, which claims priority to the German application 10 2007 010 564.0 filed Feb. 22, 2007.

The invention relates to a method for producing a programmed shape memory polymer (triple-shape polymer) and a method for programming a shape memory polymer which, in addition to a permanent shape, can assume at least two temporary shapes depending on the temperature.

Conventional so-called shape memory polymers or SMPs are known which exhibit, when a suitable stimulus is applied, a shape transformation from a temporary shape into a permanent shape according to prior programming. This shape memory effect is most frequently stimulated thermally, meaning that a recovery takes place when the polymer material is heated about the defined switching temperature that is driven by entropy elasticity. Shape memory polymers are typically polymer networks where chemical (covalent) or physical (non-covalent) cross-linked positions determine the permanent shape. Programming is performed by deforming the polymer material above the transition temperature of one phase (=switching phase) formed by one switching segment and subsequently cooling below this temperature while maintaining the deformation forces, in order to fix the temporary shape. Renewed heating above the switching temperature results in a phase transition and recovery of the original permanent shape. (Because the switching temperature $T_{sw}$, unlike the transition temperature $T_{trans}$, depends on the mechanical movement that defines the macroscopic change in the shape, both temperatures can be slightly different from one another).

More recently, AB-polymer networks have been described (so-called triple-shape polymers) which have two phases formed of different switching segments with different transition and switching temperatures, respectively, so that they can store, in addition to their permanent shape, two temporary shapes in their "shape memory" (for example, WO 99/42528 A). These triple-shape polymers have basically at least two non-intermixing phases, so that each phase can be used for fixing a corresponding temporary shape. The permanent shape is defined by covalently cross-linked positions in the polymer network, wherein the two temporary shapes are defined by a (according to the state-of-the-art, double-step) thermo-mechanical programming process. The ability to perform two consecutive shape transitions through application of temperature, namely from a first temporary shape to a second temporary shape and from there to the permanent shape, allows complex movements and has the potential for numerous applications, for example in medicine.

For example, EP 1 362 879 A describes shape memory polymers (in this case, interpenetrating networks, IPNs) consisting of a covalently cross-linked polymer component, in particular based on caprolactone-, lactide-, glycolide- or p-dioxanone units, and a non-covalently cross-linked polyester urethane component. The polymer can store two temporary shapes, with switching temperatures of 50 and 90° C. being described.

Liu et al. (Macromol. Rap. Comm. 26, 2005, 649ff) describe a SMP (in this case, a semi-interpenetrating network SIPN), consisting of polymethylmethacrylate units (PMMA) and polyethylene glycol units (PEG), which also has two switching temperatures (at 40 and 86° C.). However, the described programming method only permits storing one temporary shape.

Bellin et al. (Proc. Natl. Acad. Sci. U.S.A. 2006, 103, 18043-18047) and the still unpublished DE 10 2006 017 759 describe a triple-shape polymer with switching segments based on polyester and polyacrylate, in particular based on poly(ε-caprolactone) (PCL) and poly(cyclohexyl methacrylate) (PCHMA), as well as an associated programming method. For storing two temporary shapes, an essentially dual-step thermo-mechanical method is provided, wherein the polymer is cooled, while fixing the first temporary shape, to a temperature below the upper transition temperature, whereas the polymer is subsequently cooled to a temperature below the lower transition temperature for fixing the second temporary shape. This dual-step programming produces good results, but is relatively time-consuming and requires a complex combination of temperature control and mechanical deformation.

It is therefore an object of the invention to provide a method for programming at least two stored shapes of a shape memory polymer (triple-shape polymer) which can be performed more quickly and which is simpler than the conventional method.

This object is attained with a method having the features of claim 1, the method of the invention for producing a programmed shape memory polymer, which assumes a first temporary shape and at least two additional stored thermally activatable shapes, namely at least one second temporary shape and a permanent shape, includes the steps of:
  (a) providing a shape memory polymer which has at least two switching segments (A, B), which through phase segregation each form a switching phase having each a corresponding transition temperature ($T_{transA}$, $T_{transB}$),
  (b) deforming the shape memory polymer into a shape corresponding to the first temporary shape at a temperature above the upper transition temperature ($T_{transA}$), and
  (c) cooling to a temperature below the lower transition temperature ($T_{transB}$) by fixing the first temporary shape.

Unlike with conventional methods where programming is performed in two steps, wherein a temporary shape is defined in each step by cooling below the next lower transition temperature while fixing the predetermined deformation, the programming method according to the invention has only one such step at which cooling is performed across post-transition temperatures in a single step. With this simplification, the method is altogether faster and less complex. The result of the programming method is a triple-shape polymer which exists in a first temporary shape and which has stored in its shape memory, in addition to the permanent shape defined by the cross-linked locations, a second temporary shape. By thereafter sequentially heating above the two switching temperatures of the switching segments, beginning from the first temporary shape, first the second temporary shape and thereafter the permanent shape is restored sequentially. The possibility of a one-step programming was surprising because a reproducible formation of a second temporary shape could be observed during the (gradual or stepwise) heating, without such second temporary shape having been imposed by a defined shape stress during programming.

"Switching segment" refers to the chain segment of the polymer network which forms the switching phase. The switching phase is formed by phase segregation of different chain segments of the polymer network in the solid and contributes substantially to the formation of the typical morphology of the material. In this way, the polymer network as a whole has material properties which can be associated with the respective switching phases, in particular two or more different transition or switching temperatures for the thermally induced effect, which can be independent of one another glass transition temperatures or melting temperatures.

Particularly suited for the one-step programming according to the invention are shape memory polymers having an AB-network architecture, where the polymer chains (switching segments) forming the switching phases are covalently bonded with both their respective chain ends in the polymer network. The two temporary shapes are sufficiently fixed in this way by deformation of the two switching segments— even with a one-step programming method.

The deformation that occurs in the aforementioned step (b), i.e., the application of a mechanical shape deformation to transform the polymer system from its permanent shape into the first temporary shape, can be attained, for example, by expansion in at least one spatial direction, a compression in at least one spatial direction or a more or less complex bending of the shape memory polymer.

Combinations of the aforementioned deformations are also possible. Basically, the second temporary shape attained during heating for recovering the stored shapes represents an intermediate shape between the first temporary shape and the permanent shape. If the shape memory polymer is expanded, for example, in one spatial direction, then the second temporary shape will attain a length which is between the length of the first temporary shape and the permanent shape. The magnitude of the recovery of the programmed shape memory polymer during heating to the highest transition temperature from the first temporary shape to the second temporary shape and/or from the second temporary shape to the permanent shape is substantially affected by the mass fractions of the at least two segregated phases in the polymer.

A particularly suitable shape memory polymer within the context of the present invention has at least two switching phases with different transition temperatures, so that the polymer material can assume in addition to a permanent shape at least two temporary shapes, wherein a first switching segment which forms the first switching phase is preferably based essentially on a polyester of the general formula I with n= 1 . . . 14 or a derivate thereof, or on a co-polyester with the general formula I with n=1 . . . 14, wherein at least two such ester units are present, or a derivate thereof. Within the context of the present invention, derivates of the polyester according to formula I include structures where one or several hydrogen residues of the methylene units (—CH$_2$—) are exchanged for linear or branched, saturated or unsaturated C1- to C14-residues. Significant in the selection of the substituents within the described context is that the formation of an independent segregated phase of the switching segments is not prevented.

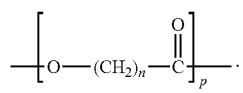

(I)

In an advantageous embodiment of the invention, the first switching segment includes a poly (ε-caprolactone)-segment with n=5 or a derivate thereof, in which the aliphatic carbon atoms can be substituted independent from one another with one or two, linear or branched, saturated or unsaturated C1- to C14-residues. Particularly advantageous is, however, non-derivatized poly (ε-caprolactone) with n=5 (PCL) according to a formula I, i.e., without substituents.

According to another advantageous embodiment, a shape memory polymer is used which has a second switching segment forming the second switching phase, which is based essentially on a polyacrylate of the general formula II, wherein R is equal to H or CH$_3$ and R$_1$ is a saturated or unsaturated, cyclic or aliphatic, unsubstituted or substituted C1- to C18-residue.

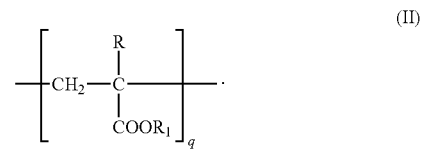

(II)

In another advantageous embodiment of the invention, the second switching segment includes a poly(cyclohexyl methacrylate)-segment (PCHMA) with R=CH$_3$ and R$_1$=C$_6$H$_{11}$ (cyclohexyl) or a poly(cyclohexyl acrylate)-segment with R=H and R$_1$=C$_6$H$_{11}$ according to a formula II. Particularly preferred of these compounds is poly(cyclohexyl methacrylate). Additional advantageous switching segments belonging to the formula II are poly(methyl methacrylate) (PMMA) and poly(2-hydroxyethyl methacrylate) (PHEMA).

In a particular preferred embodiment, a shape memory polymer may be employed whose first switching segment is a polyester or a co-polyester having the general formula I with n=1 . . . 14, in particular poly(ε-caprolactone), and whose second switching segment is polyacrylate of the general formula II, in particular poly(cyclohexyl methacrylate). This composition produces a material which is capable of, after suitable programming, simultaneously fixing at least two temporary shapes, which can be recovered after activation by corresponding several stimuli. The switching temperatures of the aforedescribed polymer system should be mentioned as particularly preferred properties, which have a large temperature difference between one another. More particularly, the two switching temperatures of the switching segments according to formula I and II differ by at least 40 K, in particular by at least 50 K, and preferably by at least 60 K. Another advantage of the material is the high switching temperature of the poly (meth)acrylate segment which is, depending on the residue R$_1$ and the average chain length q, at least 110° C., in particular at least 120° C.

The molecular weights of the employed chain segments and their mass fractions in the aforementioned polymer and their relative mass ratios (switching segment A:switching segment B) are preferably adjusted so that the aforementioned temperatures are maintained and noticeable shape changes are attained at the at least two switching transitions according to the one-step programming method. Advantageously, the chain segments (polyester-based) forming the switching phase A have an average molecular weight in a range of 2,000 to 100,000 g/mole, in particular from 5,000 to 40,000 g/mole. Preferably, a mass fraction of the poly (ε-caprolactone)-segment in the shape memory polymer is greater than 30% and less than 80%, in particular in a range of 35 to 60%, preferably in a range of 50 to 60%. Likewise, the polyacrylate segment has a mass fraction of ≤70% and ≥20%, in particular in the range of 65 to 40%, preferably 50 to 40%.

The aforedescribed shape memory polymer can advantageously be produced by a process by copolymerization of
    a polyester macro-polymer with the general formula I a, wherein n=1 . . . 14 and Y is an arbitrary connecting residue, or a copolymer with the general formula I a (wherein n and Y have the meaning above) with at least two ester units with different n and m or a derivate thereof, and

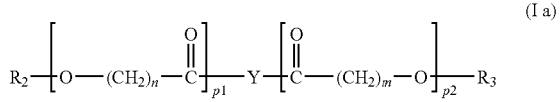
(I a)

an acrylate monomer with the general formula II a, wherein R is equal to H or $CH_3$ and $R_1$ indicates a saturated or unsaturated, cyclical or aliphatic, unsubstituted or substituted C1-C18 residue,

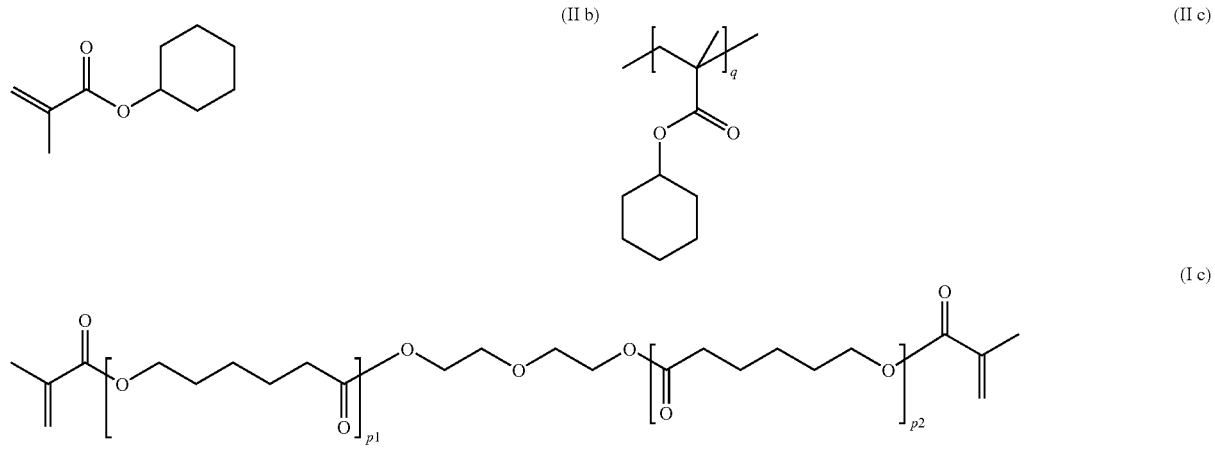

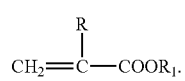
(II a)

Preferred embodiments of the polyester and the acrylate monomer are selected according to the preceding description. The chain lengths of the polyester and copolyester, i.e., p1 and p2 in formula I a, can here be identical or different. The residue Y operates only to connect the two polyester units by reversing the chain direction, so that polymerizable end groups supporting cross-linking (see below) can be added on both sides.

A suitable macro-monomer of the polyester component corresponds, for example, to the general formula I b with r= 2 ... 8 and X=O or NH. Particularly preferred is a component with r=2, p3=2 and X=O, i.e., the polyester macro-monomer is obtained by polymerization of diethylene glycol HO—$CH_2$—$CH_2$—O—$CH_2$—$CH_2$—OH with the corresponding ester monomers.

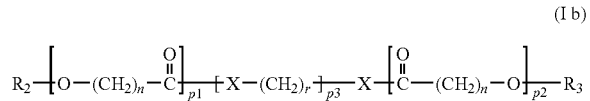
(I b)

Preferably, the first end group $R_2$ and/or the second end group $R_3$ of the first switching segments are independently a polymerizable residue. Preferably, both $R_2$ and $R_3$ are each a polymerizable residue. In a particularly preferred embodiment, acryl- or methacryl residues are used for $R_2$ and/or $R_3$. This produces during copolymerization of both components a network in which the polyester segments are linked on both sides.

According to a particularly preferred embodiment, cyclohexyl methacrylate according to formula II b is used as acrylate component, which during its (homo) polymerization produces poly(cyclohexyl methacrylate)-segments according to formula II c.

In a particular preferred embodiment, macro-dimethacrylate, namely poly(ε-caprolactone)-dimethacrylate (PCLDMA) according to formula I c, which is used as an oligomer cross-linker and has a molecular weight of about 10,000 g/mole, is copolymerized with the monomer cyclohexyl methacrylate (CHMA) according to formula II b. This produces a cross-linked AB-block copolymer, which includes segments according to formula I c and segments according to formula II c.

The aforedescribed shape memory polymer can advantageously be used in the construction industry, for example for fasteners, which can be transformed into an anchoring shape following application of a corresponding temperature stimulus. More particularly, the polymer of the invention is advantageous for applications at relatively high temperatures (reaching 100° C.), where the complete recovery of the permanent shape of the polymer is not desirable.

Additional preferred embodiments of the invention are recited as additional features in the dependent claims.

Exemplary embodiments of the invention will now be described with reference to the appended drawings.

Figure 3:
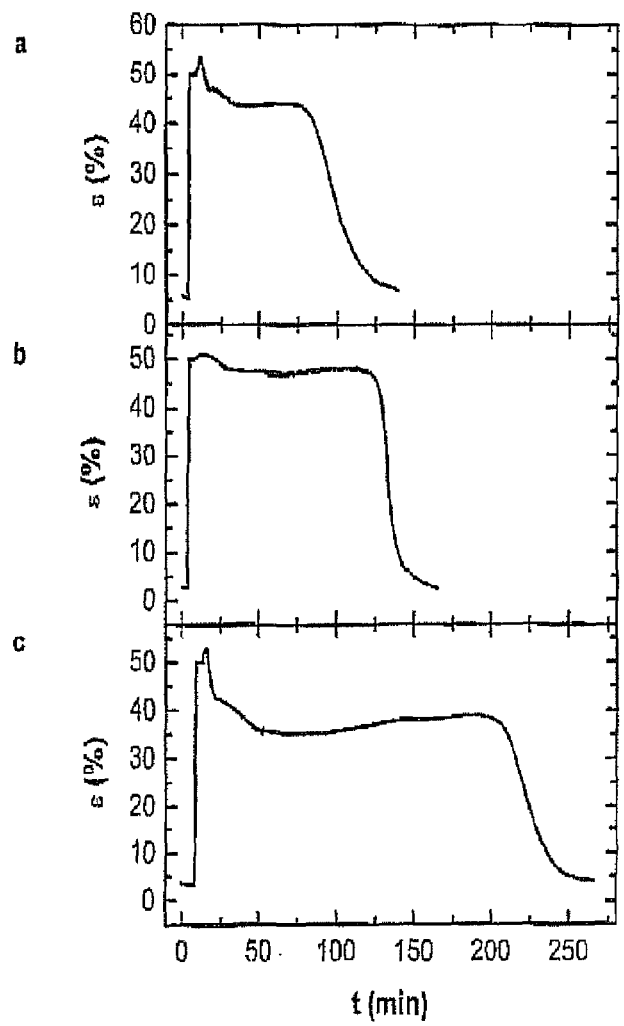
Figure 2:
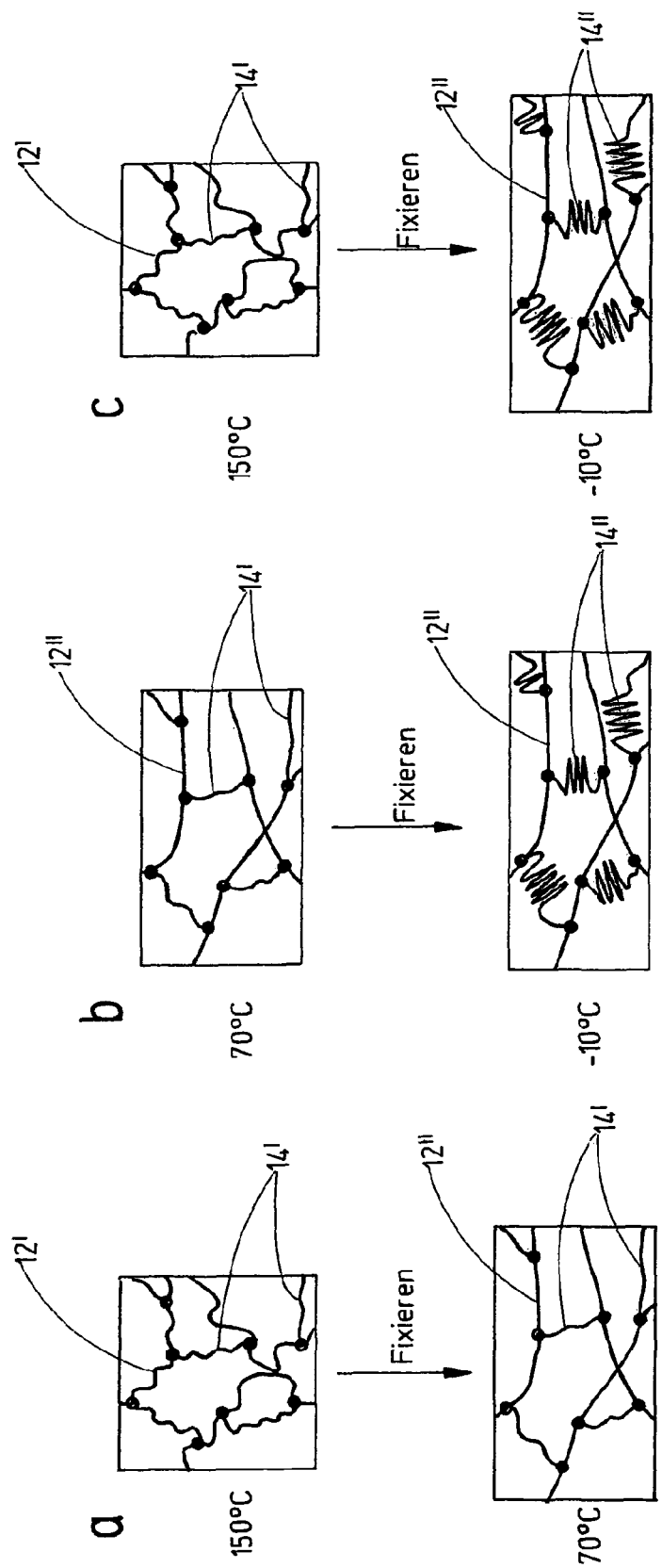

FIG. 1 shows schematically the structure of an AB-polymer network obtained through copolymerization of PCLDMA macro-monomer and CHMA monomer, which is used as example to demonstrate the programming method of the invention, FIG. 2 shows structural changes of an AB-polymer network according to FIG. 1 during one-step programming, a) fixing a temporary shape through the PCHMA phase (dual-shape effect), b) fixing a temporary shape through the PCL phase (dual-shape effect), c) fixing two temporary shapes through the PCHMA phase and the PCL phase (triple-shape effect), and FIG. 3 shows a time dependence of the expansion of a PCL-PCHMA network obtained during the fourth cycle in a cyclic thermo-mechanical experiment, a) $T_t$=70° C., $T_h$=150° C., b) $T_t$=−10° C., $T_h$=70° C., c) $T_t$=10° C., $T_h$=150° C.

The programming method according to the invention will now be described for an example of an AB polymer network of poly(ε-caprolactone) (PCL) and poly cyclohexyl methacrylate (PCHMA), which can advantageously be used for the programming method of the invention.

1. Synthesis of an AB-Polymer Network Through Copolymerization of PCLDMA and CHMA Poly(ε-caprolactone)-dimethacrylate (PCL10kDMA) was produced as described in Bellin et al. (Proc. Natl. Acad. Sci. U.S.A. 2006, 103, 18043-18047) and DE 2006 017 759.2 from poly(ε-caprolactone)-diole having an average molecular weight of 10,000 g/mole (PCL10k-diole) and methacryloyl chloride. The extent of methacrylation, as determined by $^1$H-NMR spectroscopy, was about 85%. PCL10DMA and cyclohexyl methacrylate (CHMA) (purity ≥97%, Aldrich) according to formula II b (see above) were weighed with different mixing proportions between 10 and 80 wt. % PCLDMA. These mixtures of PCL10kDMA and CHMA where melted at 70° C. in a flask in an oil bath. After a bubble-free homogeneous melt was obtained, the mixtures where poured onto a glass plate (10×10 cm) and the form was close by placing another glass plate on top with PTFE spacers (thickness 0.5 mm) arranged along the sides. The form was fixed with clips and irradiated without addition of a photo initiator for 1 h using a UV system (F300M, Fusion UV, Gaithersburg, Md.), which included a high-pressure mercury vapor lamp (1800 W), to initiate with the photo initiator the free radical polymerization/cross-linking. The distance between the lamp head and the sample was 25 cm (T=90° C.). After hardening, the samples where extracted with chloroform to remove unreacted components and were dried until reaching a constant weight. Pure PCL10kDMA was cross-linked in the same manner by photo-polymerization to attain a homo-polymer network of PCL10kDMA (PCL (100) in Table 1).

The compositions of the polymer networks were determined by $^1$H-HRMAS-MMR spectroscopic measurements (Bruker DCX 300). Although the employed quantities of PCL10kDMA and CHMA were not quantitatively incorporated in the network, it could be demonstrated that the actual composition corresponds approximately to the initial ratio of the two components in the polymer network.

FIG. 1 shows schematically the idealized structure of a PCL-PCHMA network obtained in this manner, designated with the reference symbol 10. The symbol 12 designates here the segments B (poly(cyclohexyl methacrylate) segments, PCHMA segments), with the symbol 14 designating the segments A (PCL segments). The PCHMA segments 12 are covalently cross-linked by the PCL10kDMA chains 14 bonded to both ends. The same applies for the PCL segments 14 which are also present with covalent cross-linking on both sides (not illustrated). The cross-linking locations between the ends of the PCL segments 14 and the PCHMA segments 12 are designated with the symbol 16.

2. Characterization of the Polymer Networks of PCLDMA and PCHMA

The thermal properties of the polymer networks produced according to Example 1 from PCL macro-monomers and CHMA monomers of different composition were investigated after extraction with chloroform using dynamic-mechanical thermal analysis (DMTA) in order to confirm the existence of segregated phases, because a crystalline PCL phase and an amorphous PCHMA were to be used for fixing temporary shapes. The DMTA measurements were performed on an Eplexor 25 N (Gabo), which was equipped with a 25 N force transducer. The static load was 0.50%, the dynamic load 0.20%, the frequency 10 Hz and the heating rate 2 K*min$^{-1}$ in a temperature range of −100 to 170° C.

The AB polymer network containing the PCL and PCHMA segments shows in the range between 0 and 150° C. well differentiated phase transitions, which are caused by melting of PCL crystallites and the glass transition of PCHMA domains. The lower transition temperature $T_{transA}$ is unambiguously associated with the melting or crystallization of PCL segments, which is observed in the homopolymer PCL (100) at 58° C., and which is in the copolymer networks with a PCL mass fraction between 10 and 80% at 43 to 51° C.($T_m$ (PCL)). The upper transition temperature $T_{transB}$ of about 140° C. detected in materials containing up to 45 wt. % can be unambiguously associated with the glass transition of PCHMA segments ($T_g$(PCHMA)). It was not possible to determine $T_g$(PCHMA) for AB polymer networks with 50 wt. % or more PCL due to the unfavorable signal-to-noise ratio in the DMTA experiment.

The results show that the AB polymer network has a phase-separated morphology in which the PCL and PCHMA segments form their own phases with discrete transition temperatures that are suitable for temperature-controlled fixation of two temporary shapes. Because the values determined for $T_m$(PCL) and $T_g$(PCHMA) in the copolymer network are not substantially different from those of the corresponding homopolymers, the existence of mixed amorphous phases can be ruled out.

3. Programming a Polymer Network of PCLDMA and PCHMA

In AB polymer networks, the different switching segments can be used with a one-step programming method for fixing a temporary shape. By adjusting the temperature range for programming, a switching segment for fixation can be intentionally selected. First, conventional dual-shape programming is described in the Examples 3.1 and 3.2 by way of a transition temperature ($T_{transA}$ or $T_{transB}$) (FIG. 2a and 2b), before the one-step programming method is described for triple-shape programming by using two transition temperatures ($T_{transA}$ and $T_{transB}$) with reference to Example 3.3 (FIG. 2c). In the present example, $T_m$(PCL) corresponds to the lower transition temperature $T_{transA}$ and $T_g$(PCHMA) to the upper transition temperature $T_{transB}$.

3.1 Programming a Temporary Phase Using Fixation by PCHMA

The AB polymer networks produced according to Example 1 based on PCLDMA and PCHMA were programmed in a cyclic thermo-mechanical experiment so that in addition to the process-related permanent shape a temporary shape was stored in the "shape memory" of the polymer and fixed by the PCHMA phase. An upper programming temperature ($T_h$) 150° C. was used, which is above the glass transition temperature of PCHMA ($T_g$(PCHMA)), whereas the lower programming temperature ($T_t$) 70° C. was below $T_g$(PCHMA) but above $T_m$(PCL). The molecular processes are illustrated in FIG. 2a, wherein the amorphous-viscoelastic state of PCHMA is indicated with 12', the amorphous state of PCL in the melt with 14', and the glass phase of PCHMA with 12'.

First, the polymer material was heated to $T_h$=150° C. (FIG. 2a, top) and deformed by one-dimensional expansion. At 150° C. all polymer segments are viscoelastic, so that the macroscopic deformation of the sample causes orientation of both the PCL and the PCHMA segments. By fixing this temporary shape, the sample was cooled to $T_l=70°$ C., i.e., to a temperature below the glass transition temperature of PCHMA ($T_g$(PCHMA)) (FIG. 2a, bottom). As a result, the glass transition of the PCHMA takes place (12'→12"), whereas the PCL phase remains in its amorphous-viscoelastic state 14'.

When the stress on the sample is subsequently relieved, only the amorphous PCL segments 14' can gain entropy and cause a partial shape recovery, as long this process is not impeded by the glassy PCHMA phase. The resulting temporary shape is therefore fixed only by the PCHMA phase.

3.2 Programming a Temporary Shape Using Fixing by PCL

The AB polymer networks produced according to Example 1 based on PCLDMA and PCHMA were programmed in a cyclic thermo-mechanical experiment so that in addition to the process-related permanent shape a temporary shape was stored in the "shape memory" of the polymer and fixed by the PCL phase. An upper programming temperature ($T_h$) 70° C. was used, which is above the melting temperature of PCL ($T_m$(PCL)) and below $T_g$(PCHMA), whereas the lower programming temperature ($T_l$) –10° C. was below $T_m$(PCL). The processes on a molecular level are illustrated in FIG. 2b, wherein the amorphous state of PCL is indicated with 14', the crystalline state of PCL in the melt with 14", and the glass phase of PCHMA with 12". First, the polymer material was heated to $T_h=70°$ C. (FIG. 2b, top) and deformed by one-dimensional expansion. At 70° C. PCHMA is in a glassy state 12" and PCL in an amorphous-viscoelastic state 14'. The macroscopic deformation of the sample is therefore related to an orientation of the PCL segments. By fixing this temporary shape, the sample was cooled to $T_l=-10°$ C., i.e., to a temperature below the transition temperature of PCL ($T_m$(PCL)) (FIG. 2b, bottom). As a result, the PCL phase crystallizes (14'-14"), whereas the PCHMA phase remains in its glassy state 12". It should be noted that no quantitative crystallization of the PCL phase takes place, i.e., a portion of the PCL chains remains in the amorphous state. When the stress on the sample is subsequently relieved, this temporary shape remains almost entirely unchanged, because of the chain segments have a substantially inflexible state in both phases. The temporary shape is only fixed by the PCL phase, in particular by physical cross-linking of the PCL crystallites, because PCHMA exists during the entire programming process in the glassy state 12".

3.3 One-Step Programming of Two Temporary Shapes by Fixing with PCHMA and PCL

The AB polymer networks produced according to Example 1 based on PCLDMA and PCHMA were programmed in a cyclic thermo-mechanical experiment so that in addition to the process-related permanent shape two temporary shapes were stored in the "shape memory" of the polymer and fixed by the PCL phase 14 and by the PCHMA phase 12. An upper programming temperature ($T_h$) 150° C. was used, which is above the melting temperature of PCL ($T_m$(PCL)) and above the glass transition temperature of PCHMA ($T_g$(PCHMA)), whereas the lower programming temperature ($T_l$) –10° C. was below $T_m$(PCL) and below $T_g$(PCHMA). The molecular processes are illustrated in FIG. 2c, wherein the amorphous-viscoelastic state of PCHMA and PCL is indicated with 12' and 14', respectively, the crystalline state of PCL with 14", and the glassy state of PCHMA with 12".

First, the polymer material was heated to $T_h=150°$ C. (FIG. 2c, top) and deformed by one-dimensional stretching commensurate with a first temporary shape. As already observed in Example 3.1, at 150° C. both the PCL and the PCHMA phase exist in the viscoelastic state 14' and 12', respectively, so that both phases contribute to the macroscopic deformation of the sample by orienting the corresponding chain segments along the direction of the applied force. The sample was then cooled by fixing this temporary shape to $T_l=-10°$ C., i.e., to a temperature below the glass transition temperature $T_g$(PCHMA) and below the melting temperature $T_m$(PCL) (FIG. 2c, bottom). As a result, during cooling, the glass transition of the PCHMA phase (12'→12") occurs first, followed by the partial crystallization of the PCL phase (14'→14"). When stress on the sample is subsequently relieved, the first temporary shape is almost entirely retained, because both phases have a substantially inflexible state. The temporary shape is fixed by both the PCL phase and the PCHMA phase by forming physical cross-linking.

Starting from a polymer network programmed in this manner, which exists in its first temporary shape, a second temporary shape and permanent shape can be sequentially attained, if the polymer is first heated to an intermediate temperature $T_m$(PCL)<T<$T_g$(PCHMA) and thereafter to a temperature above $T_g$(PCHMA). The recovery of previously fixed shapes is referred to as shape memory effect (SM-effect).

4. Shape Memory Effect

To determine the shape memory properties of the AB polymer networks produced according to Example 1, the samples with subjected to cyclical thermo-mechanical experiments in a tension testing apparatus equipped with a thermal chamber. In these experiments, the polymer materials were programmed in each cycle according to the temperature ranges of Examples 3.1 to 3.3 and then again heated across the same temperature ranges after the tension on the samples was relieved, wherein the recovery was monitored by measuring the expansion. FIG. 3 shows the expansion during a programming cycle and recovery cycle in the fourth cycle of the polymer PCL(45)CHM as a function of time. FIG. 3a shows the expansion-time plot for the temperature range between 70 and 150° C. according to Example 3.1 (FIG. 2a), FIG. 3b shows the plot for the temperature range between –10 and 70° C. according to the Example 3.2 (FIG. 2b), and FIG. 3c shows the corresponding plot for the temperature range between –10 and 150° C. according to the Example 3.2 of the invention (FIG. 2c).

Referring now to FIG. 3a, the sample was deformed from the permanent shape, which was restored after the third cycle, to $T_m=50\%$ at $T_h=150°$ C. Cooling to $T_l=70°$ C. below $T_g$(PCHMA) and above $T_m$(PCL) while maintaining the mechanical force initially caused a small expansion of the sample due to the entropy elasticity and thereafter a contraction of the sample due to the glass transition of PCHMA. The subsequent stress relief of the sample and reheating to $T_h=150°$ C. led to recovery of the permanent shape. This experiment confirms that the PCHMA glass phase is suitable to fix the temporary shape and to allow recovery of the permanent shape.

FIG. 3b shows the dual-shape experiment performed in the temperature range from $T_l=-10°$ C. and $T_h=70°$ C. After expansion of the sample to $T_m=50\%$ at 70° C. following the third cycle, the sample was cooled under load control to –10° C. The observed contraction is due to the energy-elastic properties of the PCHMA glass phase. Renewed heating to 70° C. induced recovery of the permanent shape in the fourth cycle. It can be seen that the time interval of the recovery phase, which is proportional to the temperature, is substantially shorter than in FIG. 3a. This leads to the conclusion that the melting process of PCL causing the recovery extends over a shorter time interval than the softening process of PCHMA that was responsible for recovery of the permanent shape in the example of FIG. 3a. This experiment confirms that the crystallites of the PCL phase are suitable for fixing the temporary shape and promote recovery of the permanent shape.

In the third case illustrated in FIG. 3c, the sample was—like in the first case—deformed at $T_h$=150° C. (according to the first temporary shape) and subsequently cooled to $T_t$= −10° C. while maintaining the mechanical force. Cooling resulted in initially glassy solidification of PCHMA, followed by crystallization of PCL. The large temperature interval of 160 K (compared with 80 K in FIGS. 3a and 3b) resulted in a stronger contraction during cooling in comparison to FIG. 3a. After relieving the stress on the sample, which is now in its first temporary shape, renewed heating to 150° C. initially results in a slow increase in the expansion due to the thermal expansion of the sample. The expansion decreased slightly at a temperature of about 54° C., which can be attributed to melting of the PCL crystallites, which for the stated composition of the sample contributed little to fixing the second temporary shape. The shape obtained after the phase transition of PCL corresponds to the second temporary shape. Additional heating to 150° C. resulted in a recovery of the permanent shape due to softening of the glassy PCHMA glass phase.

The programming and recovery cycle illustrated in FIG. 3 was performed with all AB copolymer networks of Example 1. The switching temperatures $T_{sw}$ for the PCL and PCHMA segments where determined from the $2^{nd}$ to $5^{th}$ cycles and averaged. The expansion fixation ratio $R_f$ and the expansion return ratio $R_r$ for quantifying the shape memory properties were determined and averaged in the same manner. $R_f$ is here a measure for fixing a temporary shape, whereas $R_r$ describes the extent of the recovery. The results for all three temperature ranges are summarized in Table 1.

It is evident that with one-step programming of a triple-shape polymer ($T_t$=−10° C., $T_h$=150° C.) according to the invention, polymer networks with 30% or less PCL exhibit only one phase transition caused by softening of the glassy PCHMA phase, because no segregated PCL phase is formed. On the other hand, materials with 80% or more PCL also show only a single phase transition, which is associated with melting of PCL crystallites. Two switching temperatures were observed only for materials with 35 to 60 wt. % PCL. For these compositions, both the PCL and the PCHMA phase contribute to fixing the two temporary shapes, so that triple-shape properties are obtained in the recovery process with these materials. A comparatively small contribution from PCL for fixing the shape change from the first temporary shape to the second temporary shape was observed for PCL (35)CHM, PCL(40)CHM and PCL(45)CHM, because the total deformation is not strongly expressed in the programming process. Conversely, it could be shown for PCL(50) CHM and PCL(60)CHM that the fraction of PCL for fixing the forced expansion $\epsilon_m$ can be varied. The shape changes from the first temporary shape to the second temporary shape are between 30 and 73% in relation to the total recovery, i.e., the transition from the second temporary shape to the permanent shape.

The measurements described with reference to the system consisting of PCL and PCHMA confirm that a polymer material having triple-shape properties can be obtained with the one-step programming method according to the invention.

TABLE

Shape memory properties of polymer networks from PCLDMA and CHMA determined by cyclical, thermo-mechanical experiments.[a]

| | $T_t$ = 70° C., $T_h$ = 150° C. | | | $T_t$ = −10° C., $T_h$ = 70° C. | | | $T_t$ = −10° C., $T_h$ = 150° C. | | |
|---|---|---|---|---|---|---|---|---|---|
| Sample[b] | $R_f$ [%] | $R_r$ [%] | $T_{sw}$ [° C.] | $R_f$ [%] | $R_r$ [%] | $T_{sw}$ [° C.] | $R_f$ [%] | $R_r$ [%] | $T_{sw}$ [° C.] |
| PCL(30)CHM | 93.2 ± 0.2 | 100.2 ± 3.1 | 124.5 ± 1.3 | 98.1 ± 0.2 | 98.0 ± 1.2 | 54.4 ± 0.9 | 99.6 ± 0.1 | 97.0 ± 5.3 | 26.6 ± 1.9 |
| PCL(35)CHM | 96.9 ± 1.1 | 97.6 ± 2.8 | 126.1 ± 1.7 | 97.9 ± 0.1 | 98.6 ± 1.3 | 53.3 ± 0.5 | 99.7 ± 0.1 | 100.8 ± 4.0 | 54.1 ± 0.5 125.6 ± 2.1 |
| PCL(40)CHM | 94.7 ± 1.1 | 100.1 ± 0.7 | 127.3 ± 3.0 | 98.4 ± 0.2 | 98.0 ± 2.1 | 53.0 ± 0.8 | 99.7 ± 0.1 | 97.3 ± 6.2 | 54.0 ± 0.4 124.0 ± 1.8 |
| PCL(45)CHM | 96.3 ± 0.2 | 100.8 ± 6.1 | 124.1 ± 1.1 | 98.7 ± 0.3 | 98.3 ± 1.3 | 53.5 ± 0.4 | 99.5 ± 0.2 | 95.6 ± 7.6 | 57.5 ± 0.7 124.2 ± 1.4 |
| PCL(50)CHM | 68.1 ± 3.5 | 99.0 ± 5.8 | 124.6 ± 0.7 | 99.3 ± 0.1 | 99.2 ± 0.9 | 53.4 ± 0.5 | 99.7 ± 0.2 | 102.3 ± 5.3 | 56.6 ± 0.5 123.3 ± 2.5 |
| PCL(60)CHM | 38.5 ± 1.5 | 97.0 ± 2.3 | 112.7 ± 2.1 | 99.8 ± 0.1 | 98.1 ± 2.8 | 57.4 ± 0.3 | 99.8 ± 0.1 | 100.4 ± 2.9 | 57.0 ± 0.4 110.8 ± 5.9 |
| PCL(80)CHM | — | — | — | 99.8 ± 0.1 | 97.6 ± 6.7 | 57.9 ± 0.3 | 99.8 ± 0.1 | 102.8 ± 0.6 | 57.1 ± 0.3 |
| PCL(100) | — | — | — | 99.8 ± 0.2 | 100.5 ± 9.2 | 59.1 ± 0.3 | 99.8 ± 0.1 | 96.6 ± 4.9 | 58.5 ± 0.3 |

[a]$R_f$: average expansion fixing ratio of the second to fifth cycle, $R_r$: average expansion restore ratio of the second to fifth cycle, $T_{sw}$: average switching temperature of the second to fifth cycle.
[b]The number indicated in parentheses indicates the mass fraction of PCLDMA in % during manufacture.

ABBREVIATIONS/REFERENCE SYMBOLS $T_{transA}$ Lower transition temperature
$T_{transB}$ Upper transition temperature
$T_m$(PCL) Melting temperature of the PCL segments
$T_g$(PCHMA) Glass transition temperature of the PCHMA segments
10 Polymer network
12 Segregated phase A/PCHMA segments
12' Amorphous-viscoelastic PCHMA segments
12" Glassy PCHMA segments
14 Segregated phase B/PCL segments
14' Amorphous-viscoelastic PCL segments
14" Semi-crystalline PCL segments
16 Cross-linked locations

The invention claimed is:

1. Method for producing a programmed triple-shape memory polymer, which assumes a first temporary shape and has stored at least two additional thermally activatable shapes comprising at least one second temporary shape and a permanent shape, the method consisting of the steps of:
    (a) providing a triple-shape memory polymer which has at least two switching segments (A, B), which through phase segregation each form a switching phase having each a corresponding transition temperature ($T_{transA}$, $T_{transB}$),
    (b) deforming the shape memory polymer, via application of a mechanical shape deformation, into a shape corresponding to the first temporary shape at a temperature above the upper transition temperature ($T_{transA}$), and
    (c) cooling the shape memory polymer to a temperature below the lower transition temperature ($T_{transB}$) in doing so fixing the first temporary shape by phase transition of the first switching segment (A) and programming the second temporary shape by phase transition of the second switching segment (B).

2. Method according to claim 1, wherein a shape memory polymer is provided which has an A-B network architecture, wherein the switching elements forming the switching phases are covalently bonded with both chain ends in the polymer network.

3. Method according to claim 1, wherein the mechanical shape deformation comprises expansion of the shape memory polymer in at least one spatial direction, compression in at least one spatial direction, bending, or a combination thereof.

4. Method according to claim 1, wherein an extent of recovery during heating the programmed shape memory polymer from the first temporary shape into the second temporary shape and/or from the second temporary shape into the permanent shape is determined by the mass fraction of the at least two segregated phases (A, B) in the shape memory polymer.

5. Method according to claim 1, wherein the shape memory polymer is used in step (a) in its permanent shape.

6. Method according to claim 1, wherein a shape memory polymer is provided whose first switching segment is based essentially on a polyester of the general formula I with n= 1 ... 14, or a co-polyester of the general formula I with different values for n, or a derivate thereof, wherein the first switching segment is in particular a poly (ε-caprolactone)-segment with n=5 or a derivate thereof, in which the aliphatic carbon atoms can be substituted independent of one another with one or two, linear or branched, saturated or unsaturated C1- to C14-residues, wherein a chain length p is selected as to enable the phase segregation of the first segment in the shape memory polymer

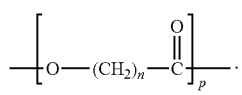 (I)

7. Method according to claim 1, wherein a shape memory polymer is provided whose second switching segment is based essentially on a polyacrylate of the general formula II, wherein R is equal to H or $CH_3$ and $R_1$ is a saturated or unsaturated, cyclic or aliphatic, unsubstituted or substituted C1- to C18-residue, wherein a chain length q is selected as to enable the phase segregation of the second segment in the shape memory polymer

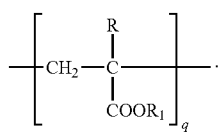 (II)

8. Method according to claim 7, wherein a shape memory polymer is employed whose first switching segment is a polyester or a co-polyester having the general formula I with n= 1 ... 14, and whose second switching segment is polyacrylate of the general formula II.

9. Method according to claim 8, wherein a mass fraction of the poly (ε-caprolactone)-segment in the shape memory polymer is greater than 30% and less than 80%.

10. Method according to claim 1, wherein the switching segments have an average molecular weight in a range of 2,000 to 100,000 g/mole.

11. Method according to claim 7, wherein the second switching segment is poly(cyclohexyl methacrylate)-segment with R=CH; and $R_1=C_6H_{11}$ or a poly (cyclohexyl acrylate)-segment with R=H and $R_1=C_6H_{11}$.

12. Method according to claim 8, wherein a shape memory polymer is employed whose first switching segment is poly (ε-caprolactone) and whose second switching segment is poly(cyclohexyl methacrylate).

13. Method according to claim 9, wherein a mass fraction of the poly (ε-caprolactone)-segment in the shape memory polymer is in a range of 35 to 60%.

14. Method according to claim 13, wherein a mass fraction of the poly (ε-caprolactone)-segment in the shape memory polymer is in a range of 50 to 60%.

15. Method according to claim 10, wherein the switching segments have an average molecular weight in a range of 5,000 to 40,000 g/mole.

16. Method for producing a programmed triple-shape memory polymer, which assumes a first temporary shape and has stored at least two additional thermally activatable shapes comprising at least one second temporary shape and a permanent shape, the method comprising the steps of:

(a) providing a triple-shape memory polymer which has at least two switching segments (A, B), which through phase segregation each form a switching phase having each a corresponding transition temperature ($T_{transA}$, $T_{transB}$);

(b) deforming the shape memory polymer into a shape corresponding to the first temporary shape at a temperature above the upper transition temperature ($T_{transA}$); and (c) cooling the shape memory polymer, while maintaining mechanical force for deforming the shape memory polymer, to a temperature below the lower transition temperature ($T_{transB}$) in doing so fixing the first temporary shape by phase transition of the first switching segment (A) and programming a second temporary shape by phase transition of the second switching segment (B).

* * * * *

UNITED STATES PATENT AND TRADEMARK OFFICE
CERTIFICATE OF CORRECTION

PATENT NO. : 8,641,951 B2  
APPLICATION NO. : 12/527366  
DATED : February 4, 2014  
INVENTOR(S) : Ingo Bellin et al.

Page 1 of 1

It is certified that error appears in the above-identified patent and that said Letters Patent is hereby corrected as shown below:

On the Title Page

Item (73) Assignee: "GKSS -FORSCHUNGSZENTRUM GEESTHACT GMBH, GEESTHACT (DE)" should read --GKSS -FORSCHUNGSZENTRUM GEESTHACHT GMBH, GEESTHACHT (DE)--

Signed and Sealed this  
Second Day of September, 2014

Michelle K. Lee  
*Deputy Director of the United States Patent and Trademark Office*